June 19, 1951 T. FLINT ET AL 2,557,219
FLUX BARRIER SYSTEM
Filed Nov. 12, 1946 7 Sheets-Sheet 2

Inventors
Thomas Flint
Everard Stubbs
by Roberts, Cushman & Grover
att'ys.

June 19, 1951     T. FLINT ET AL     2,557,219
FLUX BARRIER SYSTEM
Filed Nov. 12, 1946     7 Sheets-Sheet 6

June 19, 1951     T. FLINT ET AL     2,557,219
FLUX BARRIER SYSTEM
Filed Nov. 12, 1946     7 Sheets-Sheet 7

Inventors
Thomas Flint
Everard Stubbs

Patented June 19, 1951

2,557,219

UNITED STATES PATENT OFFICE 2,557,219

FLUX BARRIER SYSTEM

Thomas Flint, Concord, Mass., and
Everard Stubbs, Springfield, Vt.

Application November 12, 1946, Serial No. 709,334

6 Claims. (Cl. 177—351)

It is often desirable to relate two motions or positions to each other with considerable ratio of translation and yet very accurately under all conditions, regardless of the nature and correlation of the motion defining elements of construction and of the transmitted forces. In many instances these requirements prove to be irreconcilable, since most motion transmitting or position determining elements suitable for the purpose incorporate characteristics which are inherently inimical to one or the other requirement, such as backlash, inertia and dead center conditions, and limitations as to alignment and centering.

It is the main object of the present invention to provide a system which links two movements or positions with practically perfect exactness as to speed or positional relation, which permits a practically unlimited range of speed ratios of the movements of two elements connected therein, and which is very versatile and adaptable to a large variety of uses, regardless of the magnitude or configuration of the movements of forces involved.

Other objects of the invention are a system which permits exact placement of one position determining element with regard to another such element, without mechanical intermediary; to provide an indexing device with the above mentioned inherent advantageous characteristics; to provide an energy transmission and amplification or servomotor system whose effective link is energy flux of any desired type suitable for the purpose at hand; to provide a kinematic motion translating or servomotor device which incorporates as the effective speed ratio controlling, or position determining element a non-mechanical system of inherently great accuracy; and generally to provide a method of positionally correlating two bodies, and equipment for carrying out that method which is comparatively simple, inexpensive, easy to manufacture and to operate, and yet capable of the highest exactitude, and of determining a wide range of interdependent values characteristic of the kinematic or servomotor operation to be performed.

In one of its main aspects, the invention involves a method of accurately determining the relative position or relative speed of two objects, which are to be interconnected for the transmission therebetween of forces, or for determining or detecting their relative position, which method utilizes a flux or field of energy, such as electromagnetic wave energy, or hydraulic, electrostatic or magnetic flux energy, whose pattern or distribution in space is modified for purposes of the invention by means of a plurality of juxtaposed series of barriers of a nature capable of affecting the energy flow in question wherein they are interposed, which barriers are spaced at pitches varying between the respective series, and which are moved relatively to each other in a direction which determines the effective pitches of the barrier series; the pitches of the respective series differ from each other in predetermined manner and the flux distribution depends upon the relative barrier position or motion and the relative barrier pitch, so that relative movement or position of the barriers, which are related to operative elements, such as work pieces or indicating devices, can be determined through the movement or position of a predetermined flux value, such as for example a maximum, as dependent upon the barrier relation. It is a particular feature of our invention that the energy flow employed therein can be utilized not only for kinematic purposes but also for introducing amplifying energy into a transmission system.

In another aspect, the invention employs for kinematic, positional or power transmitting correlation of two construction elements, two or more barrier members associated with these elements and each incorporating a series of barrier elements capable of affecting an energy flux; for example series of barriers capable of modifying a light flux may be used, or series of mechanical vanes capable of attenuating a fluid flux, the series having different pitches of their barriers and the barrier series being movable relatively to each other in the direction of that pitch; the relation of the respective barrier pitches or the number of barriers per unit length of relative movement, determines the movement or position of a predetermined (such as an extreme, that is, maximum or minimum) value of the flux as affected by the juxtaposed barriers through which the flux is directed.

In a further aspect, the invention contemplates detection of the above mentioned predetermined (such as extreme) value of the flux as affected by the barriers, either for determining the movement of that value relatively to one of the construction elements related to the respective barriers, or for fixating the relatively movable barrier series and the construction elements related thereto in positions determined by the controllable position of the flux value in question; one of the features according to the invention, of an especially useful practical embodiment, is the use of light flux whose maximum is detected optically or with the aid of photo-electric devices.

In still another aspect of the invention, two co-linearly or concentrically arranged series of alternately light transmitting and light absorbing barriers are movably juxtaposed to each other, one series having one barrier less than the other per unit length, and these barrier series being inserted across a uniform light flux which emerges from the barriers with maxima and minima which are precisely localized by the relative position of the barrier series and which move when the barrier series are moved relatively to each other, the speed ratio of the movements of flux and barrier depending upon the barrier numbers per unit length; the ratio between flux movement and relative barrier movement can thus be selected by purely optical or other flux detecting means.

In yet another aspect, apparatus according to the invention includes two circular concentrically rotatable barrier members which separate a light source from a light detecting device of the type which integrates over a predetermined flux area and compensates for secondary flux variations within that area, which arrangement permits precise positioning and movement of any two of the above mentioned three elements, namely the two barrier members and the flux detecting device; one of the barrier members may for example be connected to an instrument or work piece holder, and the other to a work table, with holder barrier member and detecting element playing over scales. It is then possible to determine the position of the instrument or work piece relatively to the detector and to the work base, to any desired degree of accuracy depending upon the numerical relation of the barriers rather than mechanical precision. The barrier members can be made by optical rather than mechanical techniques. The light flux maximum may be detected by purely optical means such as a comparison photometer, or apparatus such as outlined above may include, according to one of the features of the present invention, a photo-electric circuit arrangement which translates a predetermined light value into electrical, such as current intensity terms which in turn indicate where, during relative movement of the barrier members, the maximum flux value is reached, or which may control servo apparatus for moving one or the other member to keep it in predetermined relation to the position or movement of a predetermined (such as maximum) flux value.

Additional aspects and features of the invention are an arrangement correlating the barriers on flat circular disc members; the arrangement of light sources and light detecting elements in equalizing or integrating cavities which are separated by the barrier disks as well as by light path defining walls; the arrangement of electronic apparatus associated with the light detecting device on a movable barrier member; the connection of movable and stationary circuit components by means of relatively movable contact elements such as slip rings and brushes within the barrier apparatus; a stop arrangement for exactly fixating the elements whose relative position determines, or is determined by that of the barrier members; and the interconnection of two of the three above mentioned relatively movable elements, namely the two barrier members and the flux detecting device, by way of a servomotor arrangement which correlates the positions or movements of these elements.

These and other objects, aspects and features will appear from the following description of several typical practical embodiments illustrating the novel characteristics of our invention.

This description refers to drawings in which.

The principles upon which the invention is based will first be explained with reference to Figs. 1 to 5.

Figures 1, 2, 3:
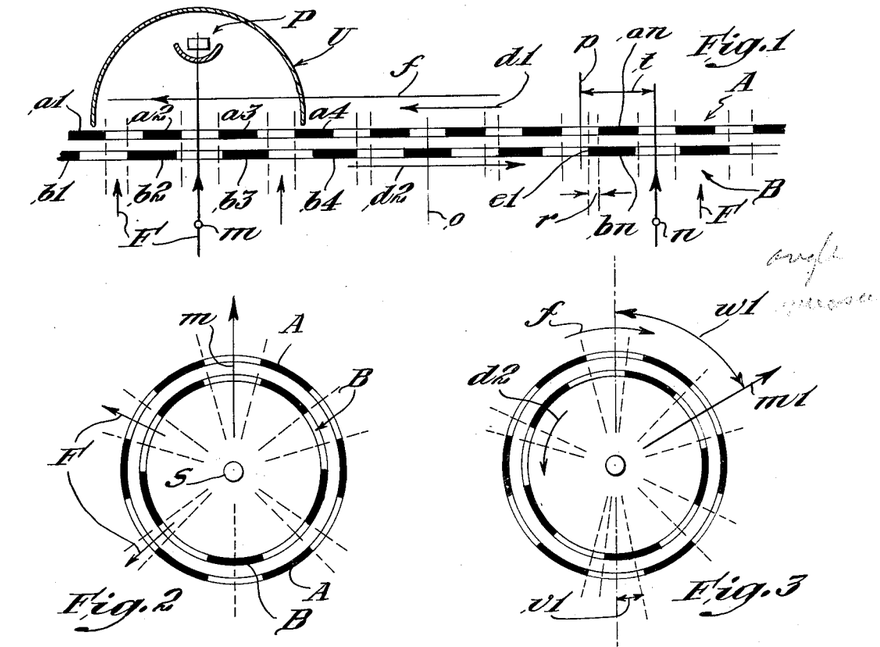
Figs. 1 to 5 are diagrams illustrating the principle underlying our invention.

In Fig. 1, A and B represent two barrier members, each carrying a number of barriers $a1$, $a2$, $a3$, ... $an$, and $b1$, $b2$, $b3$, ... $bn$, respectively. The barriers are superimposed transversely of a flux indicated by arrows F. Considering the distance from point $m$ to point $n$ as unit length, barrier member A has $n$ (for example 6), and member B has $n-1$ (for example 5) barriers. The barrier members are movable relatively to each other, which is indicated by arrow $d1$ signifying movement, in the direction of the arrow, of member A with member B stationary, and arrow $d2$ signifying movement of member B with A stationary. A flux detecting device is interposed transversely of flux F. Assuming by way of example that the energy flow is an electro-magnetic wave such as light, this detector may be indicated as shown in Fig. 1 by way of a conventional integrating cavity U which extends over several barriers, and contains a light sensitive element P protected from direct illumination.

It will be evident that integrating detector U indicates the average light flux penetrating both barrier series in the area covered by it. In the position shown, the light flux is a maximum, the interstitial spaces between $a2$—$a3$ and $b2$—$b3$ being in register at $m$. On the other hand, the flux is a minimum at $o$ where a barrier of member B registers with a transmitting interval of member A.

If now barrier B is moved towards the right, as indicated by arrow $d2$, maximum transmission will be transferred one barrier towards the left of Fig. 1, movement through a distance $r$ (indicated on the right hand side of Fig. 1) being sufficient for that purpose. Movement of barrier edge $e1$ through $r$ into position $e2$ brings the B series barrier $bn$ into maximum transmitting position relatively to the A series, at points corresponding to $p$. Referring to the right hand portion of Fig. 1 (which of course corresponds exactly to the portion covered by detector U), this has the effect of moving the point of maximum light flux transmission from $n$ to $p$, that is through a distance $t$. This movement of the light flux maximum, indicated by arrow $f$, decreases the light flux integrated within the effective area of U, and the energy amount received at $p$ is correspondingly decreased. Thus the relative position of the two barrier members A and B is indicated by the light intensity at $m$. The relative movement of the barriers through $r$ effects a greater movement of the light flux maximum through distance $t$. It will be noted that in the above instance where member B with five barriers per unit length is moved in the direction of arrow $d2$ with member A stationary, the movements of barrier and flux are in opposite directions. It will be further noted that, if member A, with six barriers, is moved in the opposite direction indicated by arrow $d1$ with member B stationary, the flux will move in the same direction as before, namely that of arrow $f$. Also, the ratio of barrier movement to flux movement is 1:5 in the first, and 1:6 in the second instance. The general rule of these relations will be given below.

Instead of arranging the barrier members linearly, they can be given any desired shape such as circular, and the above discussed advantages of the system according to the invention are indeed especially valuable in the case of circular movements whose inherent mechanical limitations are even more serious than those of linear systems.

For this reason the practical embodiments herein described are of the circular type which will first be generally discussed with reference to Figs. 2 to 5 which will also serve further to explain the general principles set forth with reference to Fig. 1.

Figure 4:
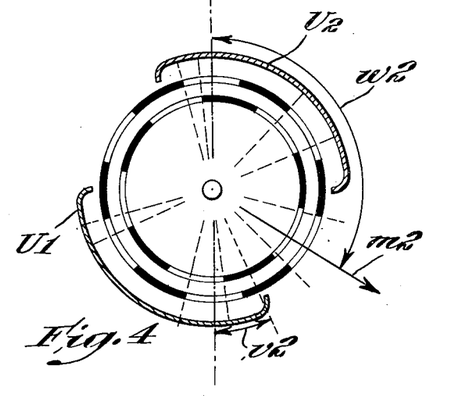
Figure 5:
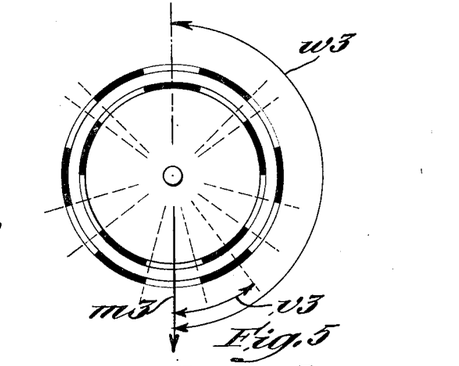

In Figs. 2 to 5, the two barriers, namely outer barrier B and inner barrier A (one or the other of which may be stationary or both of which may move relatively to each other) are arranged in the form of concentric rings with an energy flow source S such as a lamp at the center. In Fig. 2 the flux maximum is at $m$ and moves in clockwise direction if barrier B is moved in counterclockwise direction of arrow $d2$, as indicated in Fig. 3, which also indicates the movement of the flux maximum in the direction of arrow $f$. With barrier B moving through angle $v1$, the flux maximum moves through angle $w1$, which is five times greater than $v1$. As shown in Fig. 4, further movement of barrier B through angle $v2$ moves the flux maximum through an angle $w2$, and in the position of Fig. 5 with the barrier having moved through half a pitch distance $v3$, the flux distribution pattern has covered half the unit length, namely angle $w3$.

Generally speaking, if $n_1$ is the number of barriers per unit length or angle of that barrier member which moves relatively to the other member with $n_2$ barriers per unit length, the ratio of the relative speed of the barrier members, and of the speed of light flux pattern relatively to the slower member is $1:n$. If $n_1$ is larger than $n_2$, light flux and barrier member move in the same direction, but if $n_1$ is smaller than $n_2$, they move in opposite direction. In the above examples, $n_1$ of A is six and $n_2$ of B is five, so that the ratio of relative speed, herein for short also referred to as gear ratio, is six to one when A moves and five to one when B moves. In other words, the flux maximum, or any selected value of the flux which might serve as a reference point of the flux, moves $n_2$ or $n_1$ times as fast as one barrier member relatively to the other, depending on which moves faster. The directions of flux movement and relative barrier member movement are opposite if the member with the lesser number of barriers moves faster, and the same if the member with more barriers moves faster.

By increasing the number of barriers per unit length, for example the circumference of a circular system, the gear ratio can be indefinitely increased without introducing any difficulty inherent in the construction of the gear ratio determining elements which are merely flux affecting instrumentalities, as for example light absorbing or reflecting barriers whose relative location such as centering is of negligible effect upon the system.

With increased number of barriers per unit length, the detecting element, such as indicated at U and P of Fig. 1, can be made to cover a very small portion of the effective lengths of the barrier members, which increases the accuracy of detection. On the other hand, a comparatively large barrier number per unit length makes it possible to cover with the integrating device a considerable number of barriers, so that the secondary effect of flux pattern variation due to passing of the barrier edges can be reduced to any desired degree. These secondary fluctuations, however, are never of any practical importance, since they are negligible as compared to the primary change of flux value at a given point of reference.

An especially effective detecting system utilizes two integrating detector units covering two given barrier member areas located symmetrically within a unit length, up to one-half thereof for each unit. By balancing the flux values within each area, the extremes of the flux pattern can be very accurately located. Thus in Fig. 4, the detector units U1 and U2 will register equal flux values, indicating the location of axis $m2$. The embodiments described herein with reference to Figs. 6 to 21 and 24 utilize this system of detection.

The above described flux modulation or flux pattern movement can either be employed, by detecting its cycle, for counting the flux revolutions or fluctuations, or the detecting element may follow an extreme or other predetermined flux value, thus translating the flux modulation into a mechanical movement, or the detecting element may be used for precisely locating or fixating a flux value such as a maximum, thus locating or fixating the relative position of the two barrier members.

For example, if in a system according to Figs. 2 to 5, used with a detecting element as shown in Fig. 1, the moving barrier member has 360 barriers and rotates at constant speed, the detecting element can be used to count the revolutions of the barrier member, in fractions of the angular units in which its actual movement could be counted. If the detecting element is used to measure a relative displacement of the two barrier members, it will be applied to a movable part of the device in question and associated with suitable scale means.

Since detecting elements of this type can easily be made to indicate changes of the magnitude of .25% of flux value, rotation of the detecting element through $\frac{1}{100}$ of $\frac{1}{2}°$ with clear distinction of the two respective positions is easily feasible, which corresponds to relative movement of the barrier members through $\frac{1}{3600}$ degree between easily discernible positions of the indicating device. If for example the numbers of barriers per member are 360 and 359 respectively, the ratio will be 1 to 360 if the 360 barrier member moves relatively to the other, which means that in a circular system one degree of angular movement between the two barrier members corresponds to one complete revolution of the flux with one-half turn of the flux corresponding to the change of the flux from maximum to minimum or vice versa.

As previously pointed out and described hereinbelow with reference to a specific embodiment of the invention, the flux is not necessarily a light flux, but may be any other field suited to the desired type of barrier or the general problem at hand, for example a hydraulic flow, a magnetic flux, or any electro-magnetic wave in addition to visible light.

As mentioned above, possible errors inherent in discontinuous flux pattern formation due to the passing of barrier edges can be eliminated to any desirable degree of accuracy by averaging several individual barriers, as indicated in Fig. 1. Errors which might be introduced by a fluctuating flux source can be eliminated by selecting the type of flux suited for the purpose at hand, for example furnished by a constant output light source, or by using maximum or minimum values of the flux pattern as reference point, for example as mentioned above with reference to Fig. 4.

The number of barriers per unit length may differ in any desired way, although a difference of one is at the present time found to be most useful. The barrier edges are not necessarily straight or if they are straight, they do not have to be normal to the relative movement of the two barrier members; more than two barrier series may be used; also, the barrier correlation may be continuously or otherwise adjustable as to configuration and relative pitch: the gist of the invention being utilization of relatively movable barrier members with different barrier pitch for affecting a flux pattern modulation or distribution which bears a definite relation to the relative movement of the two barrier members.

With reference to Figs. 6 to 9, an embodiment of our invention will now be described which shows a light barrier member arrangement that is practical for most purposes, but has a comparatively simple purely optical detecting element. An embodiment with similar barrier members but more efficient detector and driving arrangements will then be explained with reference to Figs. 10 to 20.

In Figs. 6 to 9, 31 denotes a flanged circular base block which may be clamped or otherwise fastened to a base, such as a working table or, if the device is used for indexing, for example the indexing table of a jig borer.

Figure 6:
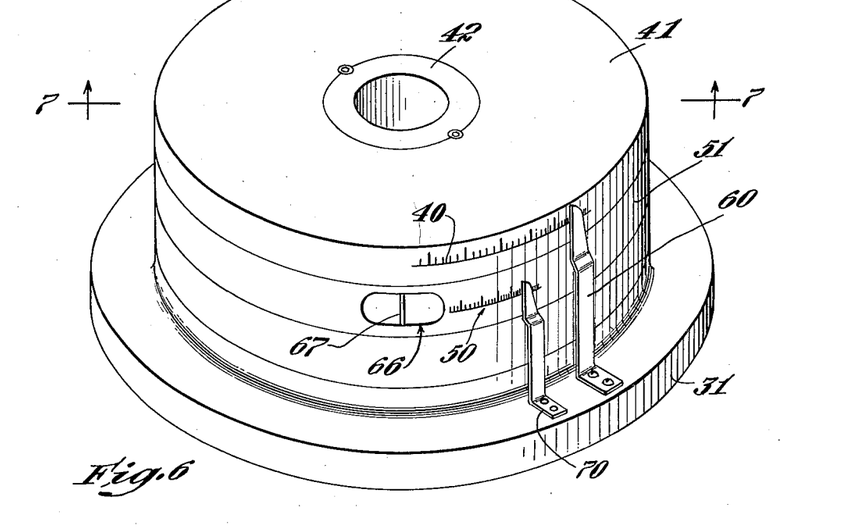
Fig. 6 is an isometric view of an optical measuring device incorporating our invention.
Figure 7:
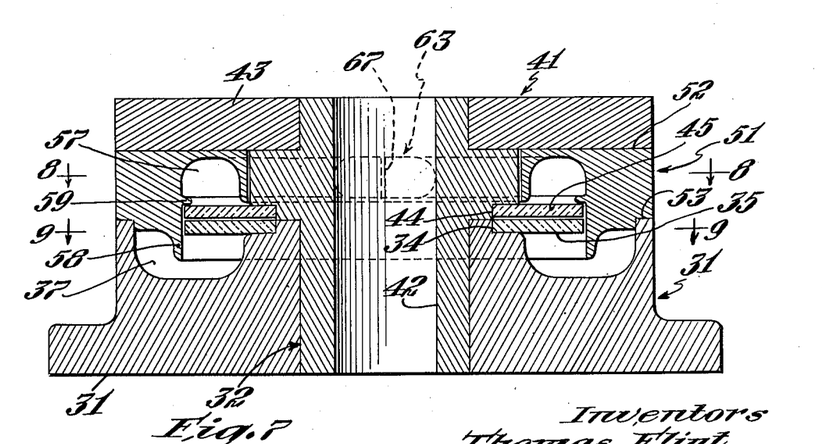
Fig. 7 is a section on the axis of the indexing device shown in Fig. 6.

Rotatable concentrically with base member 31 is arranged a work support 41 with a pivot sleeve 42 fitting the bore 32 of base 31, and with a work holding plate 43. Base block 31 and work plate 41 have recesses 34 and 44 to which are fixed the barrier members 35 and 45, respectively. A detector ring 51 is inserted between base block 31 and work holder 41, this ring being movable relatively to both base and work plate, on surfaces 52 and 53. Provisions may be made to clamp the detecting ring to either work support or base block. Work support 41 and detector ring 51 are provided with scales 40 and 50 respectively, which are associated with pointers 69 and 70, fastened to base block 31.

Base block, work support, and detector ring are provided with annular light integrating and directing cavities as indicated in Fig. 7. The base block has an annular groove 37 and the detector ring a somewhat narrower groove 57, facing groove 37 and having a downwardly extending flange 58, which approximately bisects groove 37 but reaches only about half way thereinto.

The barrier elements, in the present instance flat annular rings 35 and 45 of glass or plastic material, reach almost to the outer wall of groove 57 which has a light sealing bead 59 reaching over the barrier rings. In the present instance barrier ring 45 has 30 barrier elements (Fig. 8), and ring 35 has 31 barrier elements (Fig. 9), which may be applied photographically, or with opaque paint, or in any other way providing practically transparent light flux transmitting portions alternating with practically opaque radially extending barriers.

Figure 8:
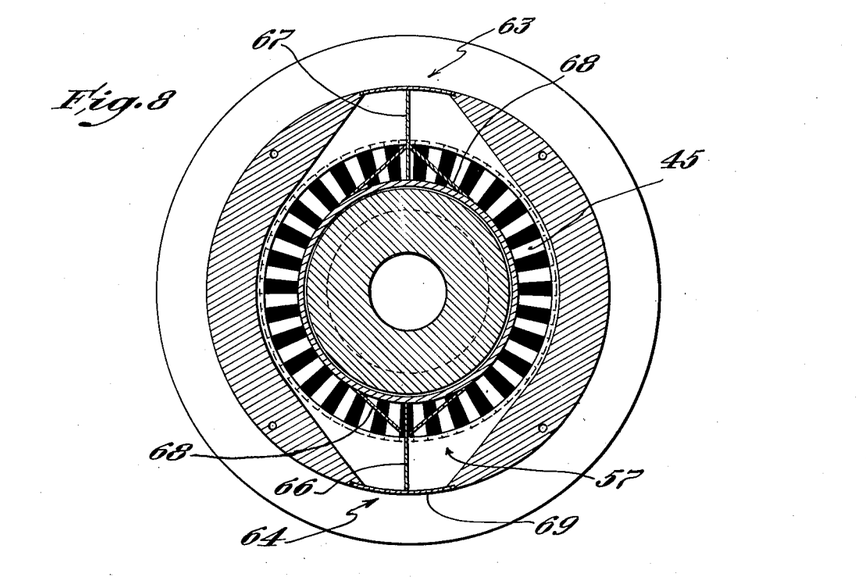
Fig. 8 is a section on lines 8—8 of Fig. 7.
Figure 9:
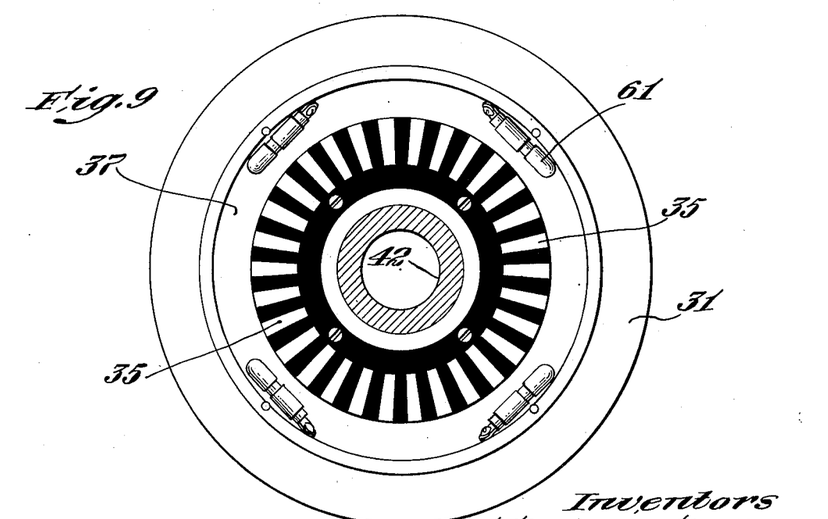
Fig. 9 is a section on lines 9—9 of Fig. 7.

As shown in Fig. 9, suitable light sources, for example four small lamps 61 are arranged in groove 37, between its outer wall and flange 58. The detector ring groove 57 has two diametrically opposite windows 63, 64 tangentially opening into the annular groove 57, as shown in Fig. 8, and divided by septum leaves 66 and 67 which lead to the inner wall of groove 57 by means of cavity leaves 68. The openings of windows 63 and 64 may be closed by translucent material, for example a mat Celluloid plate indicated at 69 of Fig. 8.

The inside surfaces of grooves 37 and 57 of the detector ring are coated with a diffusingly reflecting layer similar to that used in integrating photometric spheres.

The light of lamps 61 is diffusely reflected within cavity 37, passes through barrier members 35 and 45, and is within cavity 57 transmitted to windows 63 and 64. If the maximum or minimum value of the light flux as affected by the barrier system coincides with septums 66 or 67, the two halves of the respective windows appear of equal brightness, so that the ring 51 can be set in exact register with the extreme values of the flux.

A device of the above described type may be used and operated in various ways, for example as follows.

In order to lay out a given angle, the detector is first balanced by rotating the support block 41 on the base block 31 until both halves of a window 63 or 64 are equally bright. A fair degree of accuracy can be obtained with devices of this type, if certain well known precautions are observed, as for example discussed on pages 265 et seq. of the textbook "The Principles of Optics" by Hardy and Perrin. One of the two windows indicates minimum flux, and the other maximum flux, but it will be evident that only that indicating maximum flux will be used, two windows being provided mainly for the sake of convenience. The entire device is then rotated into register with the base line, for which purpose the base block may be rotatably supported for adjustment about a given axis coinciding with the barrier member axis. The plate 41 is then turned through the desired angle, using the rough scale 40. The detector element 51 is then set to indicate the desired angle on precision scale 50, whereupon the support 41 is rotated until the window again indicates maximum flux. The desired angle is now exactly defined by the relative position of elements 31 and 41.

If it is desired to measure an unknown angle, a base line coinciding with one side of the angle is established as above described, whereupon the plate 41 is turned to align it with the other side of the angle; the angle can now be read roughly on scale 50. Balance of the two window halves is now established by rotating detector 51, and the angle can be exactly read on scale 50.

Any degree of exactitude of fine adjustment can be reached by suitably selecting the barrier pitch. For example if the number of barriers is 60 and 61 respectively, with the 60 barrier member used as effective component, it is easy to set the barriers exact to ¼ of 1% of the maximum light intensity value, which, considering the gear ratio of 1 to 60, reduces the possible error to .0025 of 3°.

Figs. 10 to 20 illustrate an embodiment of the invention which, instead of relying on subjective evaluation of a photometric indicator, employs fully objective equipment for detecting the position of the flux pattern.

Figure 10:
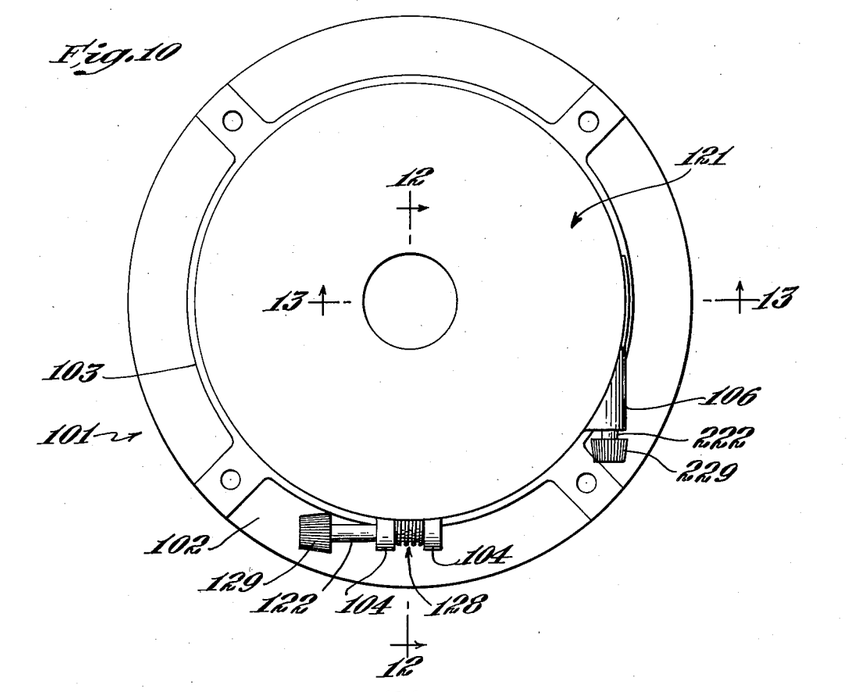
Fig. 10 is a top view of a photo-electrically controlled indexing device incorporating the invention.
Figure 11:
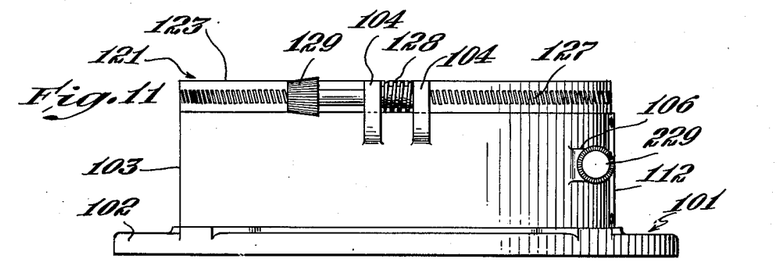
Fig. 11 is a side view of the device shown in Fig. 10.
Figure 12:
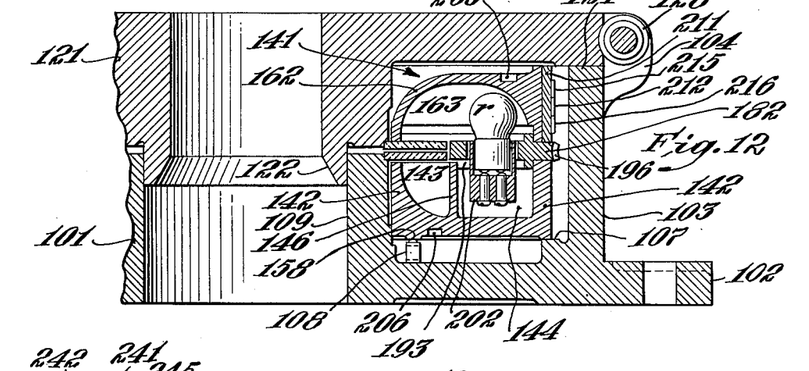
Fig. 12 is a section on lines 12—12 of Fig. 10.

In Figs. 10 to 15, numeral 101 denotes a base block with flange 102, cylindrical housing wall 103, ears 104 for supporting an adjustment device to be described below, a boss 106 for a second adjustment device, an internal supporting face 107, and a grounding device 108. The base block 101 has further a cylindrical core 109 which is machines for guiding the support plate to be described below. As indicated in Figs. 10 and 12, the housing wall 103 of base block 101 has, adjacent to boss 106, an opening 111 for a worm to be described below, which window may be closed by cover plate 112 as shown in Figs. 10 to 12.

The base block 101 supports a work holder or support block 121 which has a centering trunnion or sleeve 122 fitting the above mentioned core 109 of base block 101, and a plate 123 which slides at 124 on the upper face of the base block wall 103. As indicated in Figs. 11 and 12 and to be described in detail below, the outer edge of the plate 123 may be provided with gear teeth indentations for engagement with a worm operable for example by means of a knob 129 which may of course be replaced by a driving connection to suitable actuating mechanism, for example for remote control as by means of a Selsyn system. Base block 101 and support block 121 form an annular housing for the detector unit now to be described.

The detector unit 141, supported on base block 101 (Figs. 12 to 16), has a detector base 142, a detector cover 162, and a detector ring 182. These three members are fastened together by suitable means which for the sake of clarity are not shown in the drawings.

The detector base 142 (Figs. 12, 13 and 14) has an inner cavity or chamber 143 and two outer cavities 144, 144a which are separated from the inner cavity 143 by walls 146 and 147. The inner cavity 143 has two circular openings 151, 152, for the purpose of mounting two phototubes P1, P2. The detector base 142 has on its bottom face two machined annular surfaces, one providing at 157, near the outer detector base ball 153, a bearing surface upon which the detector unit rotatably contacts the base block face 107, and the second face 158 being located near the inner detector base wall 154 opposite the grounding contact device 108 to be described below.

Figure 13:
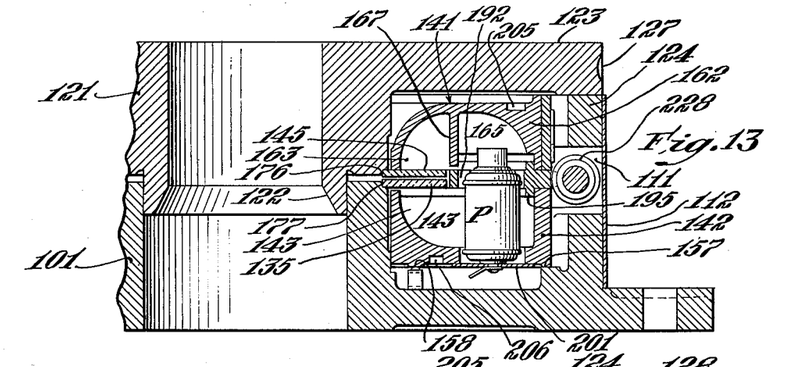
Fig. 13 is a section on lines 13—13 of Fig. 10.
Figures 14, 15:
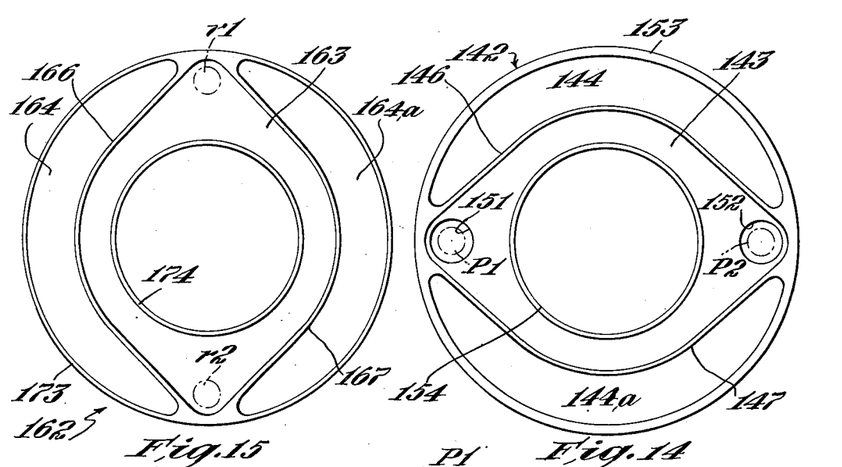
Fig. 14 is a bottom view of the base plate of the detecting unit shown in Figs. 12 and 13.
Fig. 15 is a top view of the cover plate of the detecting unit.

The detector cover 162, shown in Figs. 12, 13 and 15, has an inner cavity 163 and two outer cavities 164, 164a which are separated from the inner cavity by walls 166 and 167. The detector cover has an outer rim 173 and an inner rim 174, which are separated from the corresponding rims 153, 154 of the detector base by the detector ring structure 182 and by the barrier members 135, 145. The detector base and cover cavities together form a toroidal chamber which is subdivided by the above described walls in order to direct the light flux through the barrier members extending into the toroidal cavity.

The detector ring 182 (Figs. 12, 13 and 16) has four openings; namely, a pair of openings 192 accommodating phototubes P1, P2, and two smaller openings 193 for the lamp sockets. The detector ring has also mounting rims 195, which fit the outer detector base and cover rims respectively, and gear teeth 196 which engage the adjusting worm 221 to be described below. As indicated in Figs. 12 and 13, this detector ring extends over the outer cavities 144, 144a, and 164, 164a, of detector base and detector cover respectively.

Two barrier members, of the type described above with reference to Figs. 6 to 9 are provided, namely member 145 which is fixed in recess 176 of work plate or support block 121, and member 135 which is similarly fastened to recess 177 of the inner sleeve 109 of base block 101. The members 135, 145 carry flux barriers of different pitch, the pitch difference being chosen in accordance with the desired speed ratio of barrier and flux patterns and other criteria, as herein discussed.

The inner surfaces of the cavities, and of the detector ring are covered with material which diffusely reflects light, as described above with reference to Figs. 6 to 10.

The general shapes of the cavities of detector base and detector cover are essentially the same, but they are rotated 90° relatively to each other (as indicated by the relative position of Figs. 14 and 15) and separated by the detector ring so that, as will be explained more in detail hereinbelow, light from a source in the inner cavity 163 of the cover plate 162 will be reflected, through the two barrier members into the inner cavity 143 of the base plate 142 and hence towards the photocells P1, P2 which, as shown in Fig. 12, are mounted on plates 201 closing the openings 151, 152 of detector base plate 142 (Fig. 14). These phototubes extend with their anode terminals through openings 192 of ring 182, into outer cavities 164, 165 of the detector cover plate 162.

Fastened within the smaller openings 193 of detector ring 192 (Fig. 16) are lamp sockets 202 (Fig. 13) carrying lamps $r$ which extend into inner cavity 163 of cover plate 162, as indicated in Fig. 13.

Detector cover and detector base have annular channels 205 and 206 (Figs. 12 and 13) for the elements of the circuit to be described below. The detector cover 162 carries fastened to its outer wall a tube 211 of insulating material to which are fastened, separated by an insulating ring 212, two metallic slip rings 215 and 216 which are part of the above mentioned circuit.

The ears 104 of base block 101 carry a worm 128, which engages gear teeth 127 of support plate 123 (Figs. 10, 11, and 13) and can be operated by means of shaft 122 and knob 129. Boss 106 of base block 101 supports a shaft 222 with worm 228 (Figs. 10, 11, and 12) which engages the gear teeth 196 of detector ring 182 (Fig. 16), and can be operated by means of knob 229. As mentioned above, the window of the base block containing worm 228 can be closed by a cover plate 112 (Figs. 10, 11, and 12).

Figure 17:
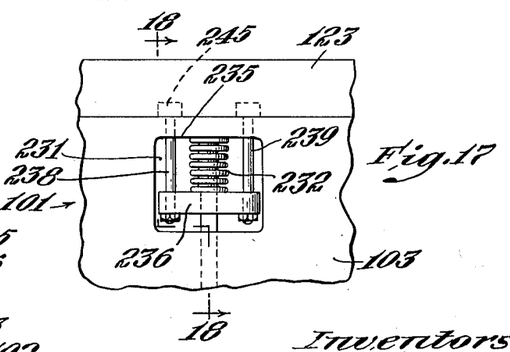
Fig. 17 is a fragmentary side elevation of a hydraulic arresting device which may be incorporated in devices for example according to Figs. 10 to 16.
Figure 18:
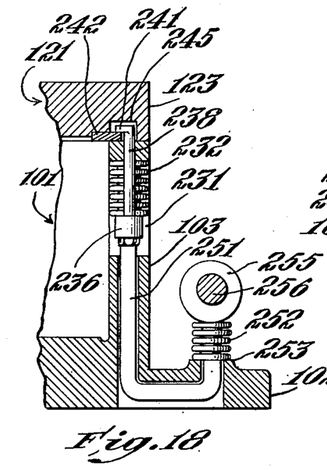
Fig. 18 is a section on lines 18—18 of Fig. 14.

In order to permit positive and rigid connection of base and support blocks 101 and 121 respectively, free from backlash and other sources of inexactness inherent in adjusting devices, arresting devices such as the hydraulic clamps shown in Figs. 17 and 18 may be provided. In these figures, 231 is a window in base block wall 103 which contains a metal bellows 232, inserted between the upper face 235 of window 231 and a cross piece 236 depending into window 231 on two bolts 238, 239 which have hook shaped end portions 241 contacting a ring 242 (Fig. 18) which is fastened to support block 121, within recess 245 of the work plate 121. A tube 251 leads from a second bellows 252 to bellows 232, bellows 252 being mounted between a boss 253 of base block flange 102 and the eccentric 255 rotatably mounted on a shaft 256 suitably journalled on the base block, and rotatable by conventional means which are not shown.

The above described barrier device is associated with a photo-electric detection and control arrangement which will now be described with reference to Figs. 19 and 20.

Figures 19, 20, 21:
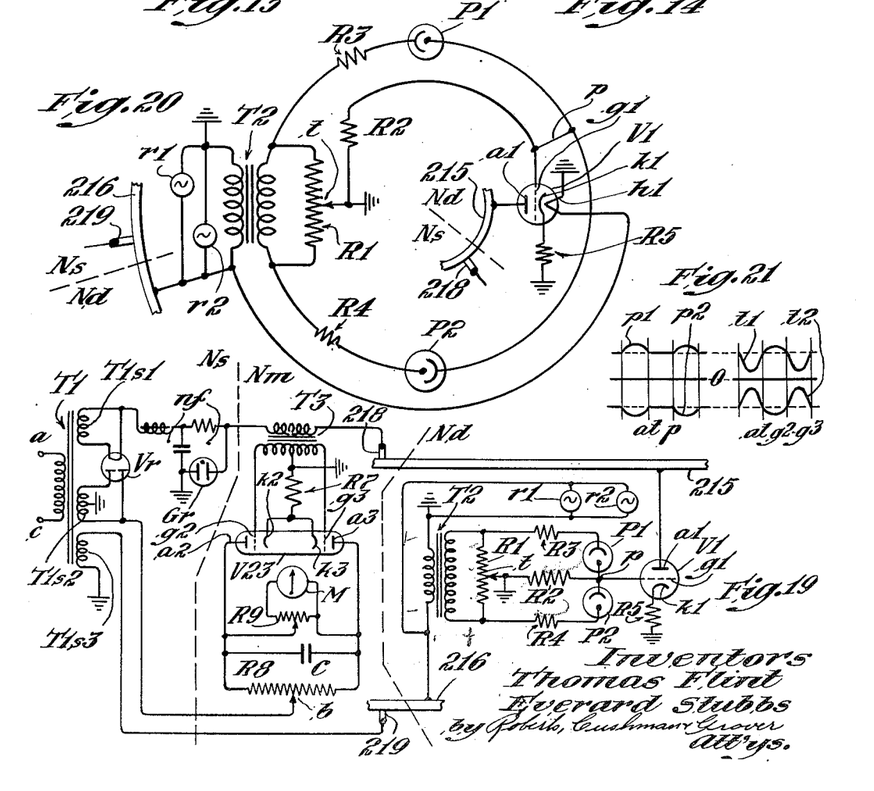
Fig. 19 is a diagram of the photo-electric arrangement incorporated in the device according to Figs. 10 to 16.
Fig. 20 is a diagram of the detecting component of the circuit according to Fig. 19.
Fig. 21 is a diagram illustrating the operation of the circuit according to Fig. 19.

The detecting and control circuit according to Figs. 19 and 20 has a supply network Ns, a detecting network Nd, and a control or measuring network Nm.

In Fig. 19, a and c are the supply terminals of a conventional alternating current system feeding into supply network Ns with transformer T1 which supplies through secondaries T1s1 and T1s2 a rectifier and voltage control network with full wave rectifier tube Vr, filter circuit nf, and voltage regulator tube Gr. A third secondary T1s3 supplies heating current for the electric discharge tubes of the system, and also supplies the lamps and the phototubes of the detecting circuit Nd.

The detecting circuit Nd is installed within recesses 205, 206 and widened portions thereof, on the detector unit 141 of the device (compare Figs. 12, 13, and 20), whereas the metering circuit Nm may be installed at any convenient place, for example in a control box easily visible from the position of the operator of the machine with which the barrier device is associated. Network Nd is connected to networks Ns and Nm by means of the above described slip rings 215 and 216 (Fig. 13) and brushes 218 and 219, which are fastened to the outer base block wall 103 in conventional manner not indicated in order to simplify the drawings.

As mentioned above, ground or other reference potential is carried into the movable system by means of grounded spring contact 108, and face 158 of the metallic detector base ring 142, to which are suitably connected all ground elements of the circuit which are to be grounded. The contact 108 may be a conventional ball and spring contactor which is conductively connected to and mounted on base block 101.

The detecting network Nd is supplied with direct current for the output circuit of its amplifier tube through slip ring 215, and with alternating current for the phototubes and lamps through slip ring 216. Slip ring 216 supplies a transformer T2 whose secondary terminals are connected to a phototube bridge which includes phototubes P1 and P2, a voltage divider R1 whose adjustable ground tap $t$ leads through resistor R2 to a conductor $p$ between the two phototubes, and two current-limiting resistors R3 and R4 for protecting phototubes P1 and P2. Conductor $p$ is connected to the control grid $g1$ of vacuum tube V1, whose cathode $k1$ is connected through resistor R5 to ground, whereas its anode $a1$ is connected to slip ring 215. Lamps $r1$ and $r2$ may be connected in parallel to transformer T2.

Figure 16:
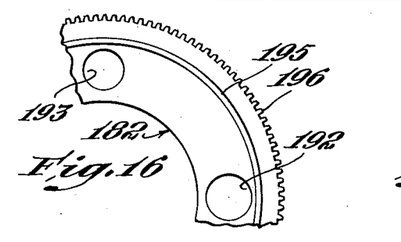
Fig. 16 is a fragmentary top view of the ring plate of the detecting unit.

As described above, phototubes P1 and P2 are mounted in openings 151, 152 of base plate 142; the lamps $r$ are mounted on base 202 in opening 193 of detector ring 182 (Fig. 16).

The metering network Nm has a transformer T3 whose primary is through brush 218 and slip ring 215 in series between direct current supply Ns and the anode $a1$ of tube V1, and whose secondary terminals are connected to the grids $g2$ and $g3$ of a duplex vacuum tube V23 with anodes $a2$ and $a3$ and cathodes $k2$ and $k3$. Cathodes $k2$ and $k3$ are connected through a resistor R7 to the grounded midpoint terminal of the secondary of transformer T3, and anodes $a2$ and $a3$ lead to the meter circuit proper which includes, in parallel connection, a balancing resistor R8 with adjustable midpoint $b$, a capacitor C, a meter resistor R9 with adjustable tap, and a zero reading meter M. The adjustable tap $b$ of resistor R8 leads to secondary T1s2 of transformer T1.

Fig. 20 indicates the arrangement of the elements of detector network Nd upon the detector ring and, in view of the above description referring to Figs. 12 to 15, and 19, requires no further explanation. It will be noted that slip rings 215 and 216 are indicated in Fig. 20, and that the circular connections between the various elements will be laid in channels 205 and 206 indicated in Fig. 13. Fig. 20 also indicates the heating element $h1$ of tube V1 with its connection between ground and transformer T2.

In a practical circuit of this type, the principal elements have the following values:

*Supply*

A. C. __________________________ 300 volt, 60 cycle

*Tubes*

V1 ___________________________________ 6AK5
V23 __________________________________ 6SN7
Gr ___________________________________ VR150
P1, P2 _______________________________ 922

*Transformers*

T1 ____________ Primary 115 v.; T1s1—6.3 v.;
                T1s2—600 v., center tapped
T2 ____________ Primary 6.3 v.; Secondary
                230 v.
T3 ____________ Voltage ratio 3:1; Secondary
                center tapped

13

Capacitor

C _____________________ microfarads __ 2

Resistors

| R1 | ohms | 15,000 |
|---|---|---|
| R2 | megohms | 20 |
| R3, R4 | do | 0.5 |
| R5 | ohms | 350 |
| R7 | do | 200 |
| R8 | do | 105,000 |
| R9 | do | 2000 |

The circuit arrangement according to Fig. 19 operates as follows:

The secondary T1s3 supplies transformer T2 of the detecting circuit with essentially sinusoidal alternating current, and tap $t$ can be adjusted to neutral potential with phototubes P1 and P2 assumed to define equal impedances. Grid $g1$ of tube V1 is then at constant potential and the tube itself has constant conductivity; this condition is indicated at O of Fig. 21. With one or the other tube receiving more light flux than the other, tap $t$ ceases to be at constant potential and applies to grid $g1$ fluctuating voltages whose deviation from the normal, constant, voltage depends upon the impedance relation of the two phototubes. Thus, if tube P1 receives more light than P2, the potential of point $p$ increases during the effective half-cycle whereas, if P2 receives stronger illumination, the potential of $p$ decreases during the same half-cycle. These conditions are indicated at $p1$ and $p2$ of Fig. 21, respectively.

The fluctuations of the potential at $p$ are amplified by tube V1 and delivered to transformer T3 of the measuring network, T3 being in the output circuit of tube V1. The output of tube V1 is essentially a 60 cycle sine wave with several harmonics. However, the phase angle between the output wave with P1 more illuminated than P2, or vice versa, is 180°; this is indicated at $t1$ and $t2$, respectively, of Fig. 21. The transformer T3 serves to isolate the plate supply voltage of V1 from the grid circuit of tube V23, and to apply the output voltage of tube V1 to the grids of tube V23.

The tap $b$ of potentiometer R8 in measuring circuit N$m$ is so adjusted that, with point $p$ of the detecting circuit at constant potential, meter M reads zero. With the conductivity of the phototubes out of balance due to unequal illumination, either grid $g2$ or grid $g3$ becomes more positive than the other during the effective half cycle series of the current in transformer T3, due to the fact that the midpoint grounded secondary of transformer T3 discriminates between the two waves $t1$ and $t2$, respectively. Tube V23 accordingly feeds pulsating direct current in one direction or the other through the meter which thus indicates which of the two phototubes P1 and P2 receives more illumination. The capacitor C has the purpose of smoothing out ripples, thus preventing vibration of the meter needle.

The device shown in Figs. 10 to 20 operates as follows.

The detector is first balanced by moving barrier structure and detector relatively to each other until meter M reads zero. From the above description, it will be apparent that this state of balance comes about as follows.

As indicated by Figs. 14 and 15, wherein the relative positions of lamps $r1$, $r2$ and phototubes P1, P2 are shown in dot and dash lines, together with Figs. 12 and 13, light from the lamps is diffusedly reflected in cavity 163, passes from 163 through barriers 145 and 135 into cavity 143 and thence towards phototubes P1 and P2. It should be kept in mind that the detector unit 141 moves as a whole, detector base 142, detector cover 162, and detector ring 182 being fastened together. Hence, if barriers 135 and 145 were omitted, the phototubes would always receive the same illumination, with the light flux in the plane occupied by the barriers being symmetrical with respect to planes through phototube and lamp axes and substantially uniform in the environment of the phototubes. This condition is disturbed when the barriers are combined in a position unsymmetric relatively to these planes. The phototubes receive then unequal amounts of light flux, with meter M indicating the unbalance as above explained. On the other hand, the tubes receive equal amounts of light and the meter reads zero when the axis through the extreme flux values ($m$ in Figs. 1 and 2) is normal to the plane through the phototubes. Hence, flux pattern and detector unit can be aligned by turning barrier members or detector until the meter reads zero. In the present instance, this can be brought about either by shifting the barrier relation by means of knob 129, or by shifting the detector system by means of knob 229.

Assuming now that it is desired to lay out a given angle (the first example discussed above with reference to Figs. 6 to 9), the support or work holder plate 123 is aligned with the base of the angle, and the resulting flux pattern aligned with the detector unit by moving the latter with knob 229 until the meter reads zero. The angle is then set by means of knob 129, zero reading of the meter exactly indicating the correct new position of plate 123. Appropriate scales are provided in the manner indicated in Figs. 6 to 9, or any other suitable way.

Other applications of this device for measuring or indexing will suggest themselves from the above description if it is kept in mind that the movement of the flux pattern is to any desired degree faster than that of the relative movement of the barriers, so that the barrier movement is indicated by the flux pattern movement (which is controlled or determined by the photoelectric detector) with an accuracy much higher than obtainable through direct observation of structure connected to the barriers. After the support plate has been moved through a desired angle by means of the worms or other appropriate adjusting means, the support plate, to which a work piece may be fastened can be securely clamped to the base block by means of the hydraulic clamp described above with reference to Figs. 17 and 18. Rotation of shaft 256 into the position shown in Fig. 18 compresses bellows 252 and expands bellows 232, thereby lowering crosspiece 236 and firmly pressing hooks 241 against ring 242. This relieves the adjusting means of any force other than that necessary for adjustment proper. With shaft 256 rotated 180° from the position shown in Fig. 18, bellows 252 expands, bellows 232 contracts, and the cross piece lifts hooks 241 from ring 242, thus releasing the block 121.

The embodiment now to be described with reference to Figs. 22 and 23 demonstrates by way of example the use, according to the invention, of an energy field other than electro-magnetic, and a device according to the present invention which is an energy valve or servomotor.

Figure 22:
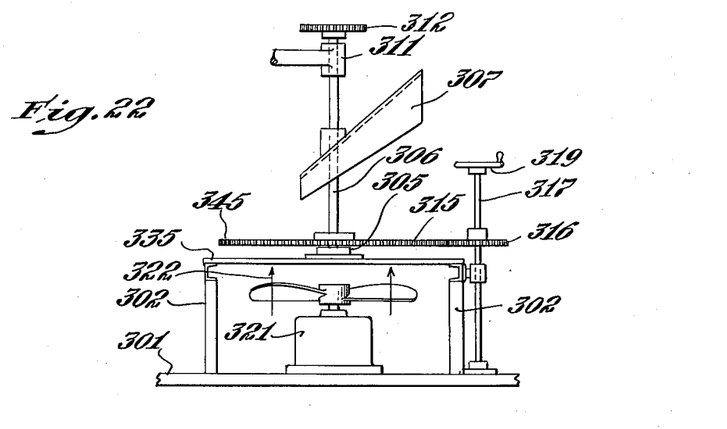
Fig. 22 is the schematic side elevation of gear apparatus utilizing a hydraulic flux according to the present invention.
Figure 23:
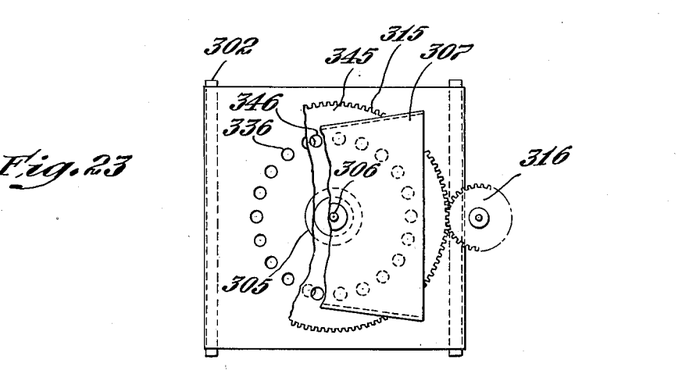
Fig. 23 is a plan of apparatus according to Fig. 21, with part of the vane and one barrier disk broken away to show the stationary barrier disk.

In Figs. 22 and 23, a base 301 supports by means of a suitable frame work 302 a stationary barrier member 335. The barrier member 335 supports a thrust bearing 305 for a shaft 306 on which rotates a movable barrier member 345 and to which is fastened a vane 307. The upper end of shaft 306 may be journalled at 311, and carry power transmission means, for example a gear wheel 312.

The edge of movable barrier member 345 carries a toothed rim 315 which meshes with a gear wheel 316 fixed to a shaft 317 which is rotatably supported on frame 302 and carries at its upper end a power transmission or drive means such as for example a hand wheel 319.

Mounted on base 301 below stationary barrier member 335 is a hydraulic flow generator, in the present instance a blower 321, which provides an essentially uniform air flow which moves upwardly towards the barrier members as indicated by arrows 322.

It will be understood that the air flow or other fluidal energy field may be provided by any convenient and practical means, for example by a duct leading towards the barrier device from a pressure tank, and that stationary vanes may be used directing the flow and stabilizing it.

The stationary and movable barrier members 335 and 345 are provided with series of openings 336 and 346 respectively, which correspond to the light transmitting barrier interstices described above. The pitch of the opening series 336 and 346 is different according to the principles of the invention, the stationary barrier member 335 having for example 20, and the movable barrier member 345 having 21 openings which, as will now be evident, corresponds to a gear radio of 1 to 20.

The vane 307 is downwardly concave and always turns into the region of the air stream of maximum intensity.

The device according to Figs. 22 and 23 operates as follows.

With the blower 321 providing an air stream moving upwardly through the barrier members, the opening 336, 346 define maximum and minimum pattern values of the hydraulic flux, and vane 307 will move into the axis through these extreme values. If member 345 is now moved by means of hand wheel 319, the flux pattern with its maximum and minimum values will move at a speed which is 20 times greater than that of the movable barrier member. Since vane 307 follows the maximum value, the corresponding motion can be derived from gear wheel 312.

It will be evident that this device serves as an energy valve in the sense that a movement of member 345, requiring a negligibly small force, determines at a given point the value of a hydraulic stream of any desirable maximum strength. The device serves as a servomotor in the sense that a very small force exerted at input member 319 is synchronously translated into a motion derived at output means 312 of different speed, and of any desirable torque depending upon the energy contents of the fluidal field.

Figure 24:
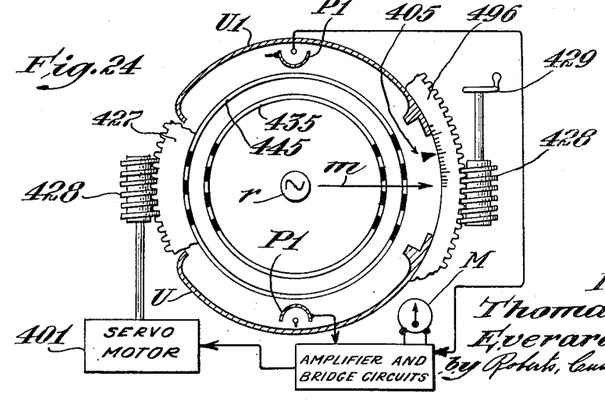
Fig. 24 is a diagrammatic view of a gear device according to the invention, incorporating a servo-motor arrangement for correlating the detecting element with one of the barrier members.

The embodiment schematically shown in Fig. 24 exemplifies the use of a device incorporating the present invention, as a precision indexing device. In Fig. 24, numerals 435 and 445 denote stationary and movable barrier members, respectively, of the type described above with reference to Figs. 2 to 20. They may be incorporated in a toroidal cavity structure similar to that described with reference to Figs. 10 to 16, but Fig. 24 in order to simplify the drawing indicates the light flux source in the center of the barrier members at *r*, and the detecting elements at U1 with photocell P1, and at U2 with photocell P2.

A worm 428 with hand wheel or knob 429 engages a gear wheel or segment 496 fastened to the detector unit U1—U2. The movable barrier member 445 is fastened to a gear wheel or segment 427 engaging a worm 428 which is drivingly connected to a conventional one to one ratio servomotor indicated at block 401.

The integrating detecting unit (compare also the description above referring to Fig. 4) is part of a detecting arrangement for example of the type described with reference to Fig. 19. The phototube bridge with its amplifier and metering circuits (the latter being indicated by meter M) controls the servomotor device 401 which is driven in one direction when the meter M (indicating unbalance of the detector unit in one sense) deviates in one direction, and which is driven in the other direction when the meter deviates in the other direction.

The device according to Fig. 24 operates as follows.

Assuming that the maximum-minimum axis of the barrier device is in direction *m* as indicated in Fig. 24, and assuming that phototubes P1 and P2 receive light values which balance the detecting circuit, the device will be stationary. If it is now desired to rotate a work piece connected to movable barrier member 445 through a given angle, this angle is set by means of hand wheel 429 and scale 405. This unbalances the phototube impedances and causes servomotor 401 to turn the movable barrier member 445 until the photocells are again balanced, that is until the barrier member 445 has moved through an angle which is proportionate to the angle set at scale 405 by the gear ratio defined through the pitch relation of the two barrier members. It will be evident that the unit angle at scale 405 can be made to any desirable degree larger than that of the angular movement to be applied to the movable barrier member, so that this movement can be defined to any desirable degree of exactness.

For purposes requiring such reversal of movement, the input drive 429 can be applied to the movable barrier member at 427—428 and the detector unit driven by a servomotor device.

It should be understood that the present disclosure is for the purpose of illustration only and that this invention includes all modifications and equivalents which fall within the scope of the appended claims.

We claim:

1. A barrier device of the type described comprising two juxtaposed relatively movable circularly flat barrier members whose position defines the distribution pattern of light flux traversing said members, a diffusedly reflecting cavity on one side of and opening upon said barrier members, a light source in said cavity, a diffusedly reflecting cavity on the other side of and opening upon said barrier members and means for detecting the intensity of light flux impinging through said barrier members upon said detecting means, said cavities together forming a toroid divided by said barrier members.

2. A barrier device of the type described comprising two juxtaposed relatively movable circularly flat barrier members whose position defines the distribution pattern of light flux traversing said members, a diffusedly reflecting cavity on one side of and opening upon said barrier members, a light source in said cavity, a diffusedly reflecting cavity on the other side of and opening upon said barrier members, and a plurality of means for detecting the light flux distribution within said second cavity, said cavities together forming a toroid divided by said barrier members.

3. Barrier apparatus of the type described comprising a circular base block having a substantially annular recess, a flat annular barrier member fixed to said base block and extending into said recess, a circular support block movable concentrically on said base block, a flat annular barrier member fixed to said support block and covering said first barrier member, a detector ring movable concentrically on said blocks and having a substantially annular recess opening upon said barrier members, a light source in one of said recesses, and photometric means associated with the other recess for evaluating the pattern of the light flux reaching said other recess through said barrier members.

4. Barrier apparatus of the type described comprising a circular base block having a substantially annular recess, an annular barrier member fixed to said base block and extending into said recess, a circular support block movable concentrically on said base block, an annular member fixed to said support block and extending over said first barrier member, a detector ring movable concentrically on said blocks and having a substantially annular recess opening upon said barrier members, a light source in one of said recesses, and means for evaluating the pattern of the light flux reaching the other recess through said barrier members.

5. Barrier apparatus of the type described comprising a base block; a support block mounted on said base block for movement thereon and forming with said base block a housing; a barrier member fastened to said base block and extending into said housing; a barrier member fastened to said support block and covering said first barrier member; a detector unit arranged in said housing for movement colinear with said blocks, said detector unit including a base member having a cavity sub-divided into an inner chamber and two outer chambers, a cover member having a cavity sub-divided into an inner chamber and two chambers, said inner chambers opening upon said barrier members, a detector member dividing said outer chambers substantially as an extension of said barrier members, a light source in one of said inner chambers, and light sensitive detector means in the other inner chamber; and means for relatively adjusting the positions of said blocks and said detector unit.

6. Barrier apparatus of the type described comprising a circular base block; a circular support block mounted on said base block for concentrical movement thereon and forming with said base block an annular housing; a flat annular barrier member fastened to said base block and extending outwardly into said housing; a flat annular barrier member fastened to said support block and covering said first barrier member; a circular detector unit arranged in said housing for movement concentrical to said blocks, said detector unit including a base ring having an annular cavity symmetrically subdivided by partitions defining a substantially annular inner chamber and two substantially semi-annular outer chambers, a cover ring having an annular cavity symmetrically subdivided by partitions defining a substantially annular inner chamber and two substantially semi-annular outer chambers, said inner chambers opening upon said barrier members, a detector ring dividing said outer chambers substantially in the plane of said barrier members, two lamps one at each of two opposite points of said detector ring and extending into one of said inner chambers, two phototubes one fastened to said base ring at each of two opposite points of the other inner chamber and effectively open to said other inner chamber, and means for leading electric current from said detector unit to said base block; means for relatively adjusting the concentric positions of said blocks and said detector unit; and means for detecting and indicating the relative values of light flux received by said phototubes from said lamps through said barrier members.

THOMAS FLINT.
EVERARD STUBBS.

REFERENCES CITED

The following references are of record in the file of this patent:

UNITED STATES PATENTS

| Number | Name | Date |
|---|---|---|
| 1,672,671 | Young | June 5, 1928 |
| 2,122,818 | Ladrach | July 5, 1938 |
| 2,167,484 | Berry | July 25, 1939 |
| 2,182,717 | Chance | Dec. 5, 1939 |
| 2,206,852 | Poupitch | July 2, 1940 |
| 2,246,001 | Powers | June 17, 1941 |
| 2,263,685 | Seil et al. | Nov. 25, 1941 |
| 2,360,581 | Powers | Oct. 17, 1944 |
| 2,451,971 | Oman | Oct. 19, 1948 |

FOREIGN PATENTS

| Number | Country | Date |
|---|---|---|
| 46,165 | France | Dec. 23, 1935 |